(12) United States Patent
Zabarski et al.

(10) Patent No.: US 6,711,661 B1
(45) Date of Patent: Mar. 23, 2004

(54) METHOD AND APPARATUS FOR PERFORMING HIERARCHICAL ADDRESS TRANSLATION

(75) Inventors: Boris Zabarski, Tel Aviv (IL); Stefania Gandal, Herzelia (IL); Vadim Vayzer, Petach Tikva (IL)

(73) Assignee: Motorola, Inc., Schaumburg, IL (US)

( * ) Notice: Subject to any disclaimer, the term of this patent is extended or adjusted under 35 U.S.C. 154(b) by 641 days.

(21) Appl. No.: 09/606,995

(22) Filed: Jun. 29, 2000

(51) Int. Cl.⁷ .............................................. G06F 12/00
(52) U.S. Cl. ........................ 711/202; 711/108; 711/113; 707/6
(58) Field of Search ................................ 711/108, 113, 711/202; 707/6, 7; 709/216; 365/49, 189.07; 370/395.52

(56) References Cited

U.S. PATENT DOCUMENTS

| | | | |
|---|---|---|---|
| 5,860,136 A | 1/1999 | Fenner ........................ 711/201 |
| 5,884,297 A | * 3/1999 | Noven ....................... 370/395.3 |
| 5,917,821 A | 6/1999 | Gobuyan ..................... 370/392 |
| 5,920,886 A | * 7/1999 | Feldmeier ................... 711/108 |
| 5,938,736 A | 8/1999 | Muller et al. ................ 709/243 |
| 5,953,312 A | 9/1999 | Crawley et al. ............. 370/218 |
| 6,237,061 B1 | * 5/2001 | Srinivasan et al. ......... 711/108 |
| 6,415,354 B1 | * 7/2002 | Joffe et al. ................... 711/108 |

OTHER PUBLICATIONS

"IP Lookups using Multiway and Multicolumn Search" by B. Lampson, V. Srinivasan and G. Varghese, May 11, 1998, Abstract and pp. 1–25.

* cited by examiner

*Primary Examiner*—Reginald G. Bragdon
*Assistant Examiner*—Pierre M. Vital (57) ABSTRACT

A method and a device for translating a hierarchical address, the device is adapted to receive a destination address, to search an array of sorted binary string being associated with a group of addresses reachable through the device, and to provide a best matching address, the device comprising: a content addressable memory module, for storing a first portion of the array of sorted binary strings; a fast memory module, for storing a second portion of the sorted binary strings; a memory module, for storing a remaining portion of the tree of sorted strings; and a search engine, coupled to the content addressable memory unit module, the fast memory module and the memory module, configured to receive a destination address, access at least the fast memory unit and the memory unit and to find the best matching address.

22 Claims, 4 Drawing Sheets

METHOD AND APPARATUS FOR PERFORMING HIERARCHICAL ADDRESS TRANSLATION

FIELD OF THE INVENTION

A method and an apparatus for performing hierarchical address translation, and especially a method and an apparatus for receiving a destination address and generating an address of a next hop router, using a content addressable memory, a fast memory module and a memory module.

BACKGROUND OF THE INVENTION

Internet routers receive data packets containing destination addresses, perform an address translation and forward the data packets according to result of the address translation process. The product of the address translation process is an address of the next hop router.

Usually, the destination address has a hierarchical structure. A hierarchical address has an internal structure that can be used in protocol processing of the address. Hierarchical addresses are used in a variety of internet protocols such as IPv6 and IPv4.

Forwarding data packets involve address lookup in a routing database. Various methods and devices for performing forwarding packets are described at U.S. Pat. No. 5,920,886 of Feldmeier, U.S. Pat. No. 5,938,736 of Muller et al, U.S. Pat. No. 5,917,821 of Gobuyan et al and U.S. Pat. No. 5,953,312 of Crawley et al.

Usually, a routing database does not include all the possible destination addresses, but has a plurality of address prefixes, each representing a group of destination addresses reachable through the same interface. The prefixes are of variable length, and a packet should be forwarded to a selected group, a selected group being a group of destination addresses that are represented by the most specific prefix/the longest prefix that matches the destination address of the data packet. "IP Lookups using Multiway and Multicolon Search" by B. Lampson, V. Srinivasan and G. Varghese, (i.e.—Lampson et. al.) describes a device and a method for performing address lookups. According to the method a trinary prefix that has "don't care" bits is encoded to two fixed length binary strings, these two strings represent a start and an end of a binary range. For example, a trinary prefix 11101* * * having three "don't care" bits is encoded to the following binary strings: 11101000 and 11101111.

All of the strings are sorted and form a first array of fixed length strings. Then, a binary search is done in order to find a best-matched string. The best-matched string is either a string that exactly matches the destination address a string that represents a start of a narrowest enclosing range between two strings encoded from a single prefix, in which the destination address falls.

Two pointers are used for each entry in the first array. A first pointer points to a string that exactly matches the destination address. A second pointer points to a string that is associated to a narrowest enclosing range that matches the destination address, when there is no exactly matching string.

For example, assuming that an string is 6 bits wide, three trinary prefixes 1*, 101* and 10101* are translated to 1***, 101* and 10101*, to be further converted to the following binary strings: 111111, 100000, 101111, 101000, 101011 and 101010, referred to as S1, S2, S3, S4, S5 and S6 accordingly. 1* is associated with a first pointer p1, 101* is associated with a second pointer p2, 10101* is associated with a third pointer p3. Each binary string is associated with a pointer that is provided when it matches the destination address and a second pointer that is provided when there is not such an exact match. S6 is associated with p1, S5 is associated with p2 and p1, S4 is associated with p2 and p3, S3 is associated with p3, S2 is associated with p2 and S1 is associated with p1.

Using two pointers for each entry is relatively memory consuming. A first portion of the first array and the accompanying pointers can be stored in a cache memory; the remaining sorted strings of the first array are stored in a relative slow external memory module. During a binary search a destination address is compared to the strings of the first portion of the first array and either a first intermediate best-matched string or a matched string are generated. Usually some iterations are required and at least a portion of the remaining sorted strings are written to the cache. The result of the last search iteration is a best-matched string, pointing to the next hop router. Usually a last level of the first array comprises of a plurality of leafs in which the next hop IDs are stored. Because two pointers are associated to each entry there is a need of many leafs.

Lampson et al. suggest partitioning the single binary search into multiple binary search tables for each value of a first Y bits. A first front-end array will store $2^Y$ best matching prefixes for the first Y bits. The I'th memory location of the first end array stores the best matching prefix of I.

Lampson et al. Further suggests to perform a multiway search instead of a binary search. A multiway search is characterized by two or more keys per node. The multiway search technique exploits the fact that most processors prefetch an entire cache line when performing a memory access and that such an entire line can store more than two strings. They further suggest performing a multicolumn search in which each string is partitioned into a plurality of columns, starting with the most significant bits of the string. A binary search is performed in each column until a match is found. After such a match is found the next columns that are associated to the prior matched columns are searched.

There is a need of an improved method and apparatus for performing a hierarchical address translation. Especially there is a need for a method and a device that are fast and are cost effective. Furthermore, there is a need of a method and device for translating a hierarchical address that consume less memory space than prior art method and devices.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE DRAWINGS

The invention provides an improved device and method for performing hierarchical address translation. The invention provides a device and a method in which CAM fast memory modules and relatively slow and cheap memory modules are used in a manner to provide a fast and cost effective device and method for translating a hierarchical address. Using a single pointer for each entry results in a lower consumption of memory space.

The invention provides a device for performing address lookups in which an N level sorted tree of strings, each string associated with a group of destination addresses reachable through the device, is stored in a manner that a at least a first level of the sorted tree is stored in content associative memory module (i.e. CAM), a following N2 levels of the sorted tree are stored at a fast memory module and a remaining N3 levels of the sorted tree are stored in a relatively slow memory module.

The invention provides a device in which the CAM stores a single node having N1 keys, the remaining N2+N3 levels of the tree are characterized by having two keys for each node.

The invention provides a method for performing a hierarchical address translation wherein a destination address is compared to a plurality of binary strings stored in a CAM, in a fast memory module and in an relatively slow memory module.

The invention provides a method for converting a trinary array of prefixes into an array of binary strings, changing a portion of the binary strings in a manner that a single pointer is associated to each binary string/range, sorting the binary strings, storing the binary strings in a CAM, in a fast memory module and in a relatively slow memory module (referred to as memory module) and performing a search for finding a selected next hop ID.

Figure 1:
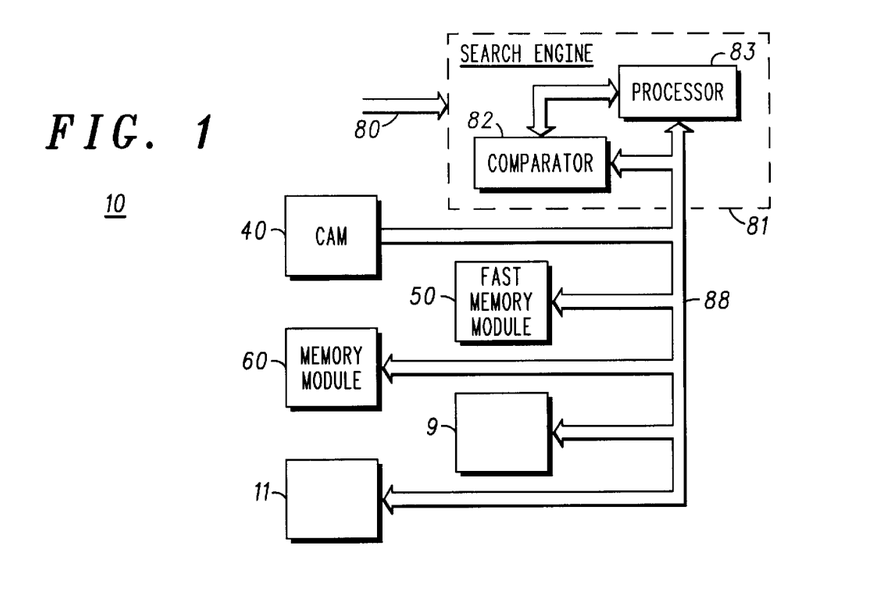
FIG. 1 is a schematic description of an apparatus for performing hierarchical address translation, according to a preferred embodiment of the invention.

FIG. 1 is a schematic description of an apparatus 10 for performing hierarchical address translation, according to a preferred embodiment of the invention. Apparatus 10 comprising host processor 9, prefix memory module 11, CAM 40, fast memory module 50, memory module 60, and search engine 81, host processor 10, and search engine 81 are coupled to CAM 40, fast memory module 50, memory module 60, and search engine 81 via data bus 88, although other configurations can be used. Host processor 9 is coupled to prefix memory module 11 in a manner that allows it to fetch trinary prefixes from prefix memory module. Host processor 9 is adapted to receive a plurality of trinary prefixes, to change a portion of the binary strings in a manner that a single pointer is associated to each binary string, to sort the binary strings and to store the sorted binary strings in CAM 40, in fast memory module 50 and in memory module 60.

Figure 3:
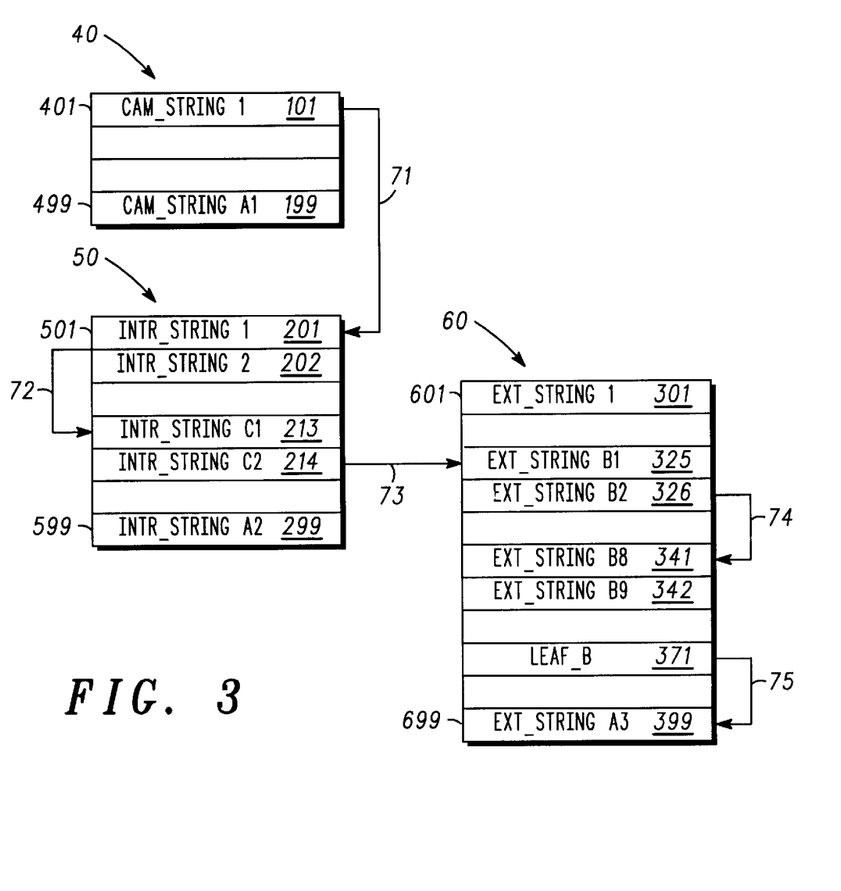
FIG. 3 is a schematic description of the content of the memory modules, according to a preferred embodiment of the invention.

Sorted binary strings (as shown in FIG. 3) are generated by a translation of a plurality of trinary prefixes, each prefix being associated with a group of addresses reachable through the device for translating a hierarchical address. Usually, the plurality of trinary prefixes have variable lengths and they are converted into a plurality of fixed size prefixes by concatenating a plurality of "don't care" bits. A prefix that has "don't care" bits is translated to two binary strings; a first binary string has "1" bits instead of the "don't care" bits of the trinary prefix, and a second binary string has "0" bits instead of the "don't care" bits of the trinary prefix. The binary strings that represent a start of a range are decreased and all the binary strings are sorted. Each sorted binary string is associated with a single pointer whereas the pointer is provided when the destination address falls in a range that starts with a sorted binary string (without including the sorted binary string) and ends at a consecutive sorted binary string that is bigger than the former sorted binary string.

For example, assuming that an string is 6 bits wide, three trinary prefixes 1*, 101* and 10101* are translated to 1***, 101* and 10101*, to be further converted to the following binary strings: 111111, 100000, 101111, 101000, 101011 and 101010 accordingly. 1* is associated with a first pointer p1, 101* is associated with a second pointer p2, 10101* is associated with a third pointer p3. The three binary strings that represent a start of a range—S6, S5 and S4 are decreased—101010 is converted to form S6' 101001, 101000 is converted to form S5' 100111 and 100000 is converted to form S4' 011111. If S6'<DA<=S5' p1 is provided. If S5'<DA<=S4' p2 is provided. If S4'<DA<=S3 p3 is provided. If S2<DA<=S3 p2 is provided and if S1<DA<=S2 p1 is provided.

The usage of a single pointer per sorted binary string allows to store a plurality of next hop ID at the leafs of the tree. Conveniently, using a trinary tree three next hop ID are associated with a pair of sorted binary strings.

The content of the memory modules is explained in greater detail further on. Search engine 81 conveniently comprises at least one comparator 82 and a processor 83, for controlling the passage of data on data bus 88. Conveniently, search engine 81 has a pipelined architecture enabling it to compare at least one destination address to at least two sorted binary strings while fetching another sorted binary strings. Preferably search engine 81 has multiple comparators that enable it to perform more than a single comparison between a destination address and a pair of sorted binary strings.

Comparator 82 receives a plurality of strings, compares them to a destination address (i.e.—AD) 80, and generates a result R 87 reflecting this comparison. Usually comparator 81 receives a node of a tree of sorted binary strings and selects a descending node out of a plurality of descending nodes associated to the node of the tree. Conveniently, comparator 82 receives a node comprising of two sorted binary strings, that have three pairs of descending sorted binary strings, and outputs R 87 that selects a pair out of the three pairs of the tree. Preferably, R 87 indicates whether DA 80 is larger than both sorted binary strings, is smaller or equal than the smaller sorted binary string of the pair or is greater than the smaller binary string of the pair and is either smaller or equal to a bigger sorted binary string of the pair.

Search engine 81 receives AD 80 and sends it to CAM 40. CAM 40 provides search engine a first intermediate best matching address—a sorted binary string that either exactly matches AD 80 or an sorted binary string that is the smallest sorted binary string stored in CAM 40 that is bigger than AD 80.

The first intermediate best matching address is sent to fast memory module 50 and is used to fetch a pair of sorted binary strings that are associated to the former string. This pair is sent to search engine 81 that determines which pair of descending strings are to be fetched to it. This step repeats for N2−1 times until a selected pair of sorted binary strings are stored in memory module 60. This pair is fetched to search engine 81 and is compared to AD 80 in order to find a selected pair of descending sorted binary strings. This step is repeated for N3−1 times until a selected next hop ID is found. After 1+N2+N3 iterations a next hop ID is found.

Figure 2:
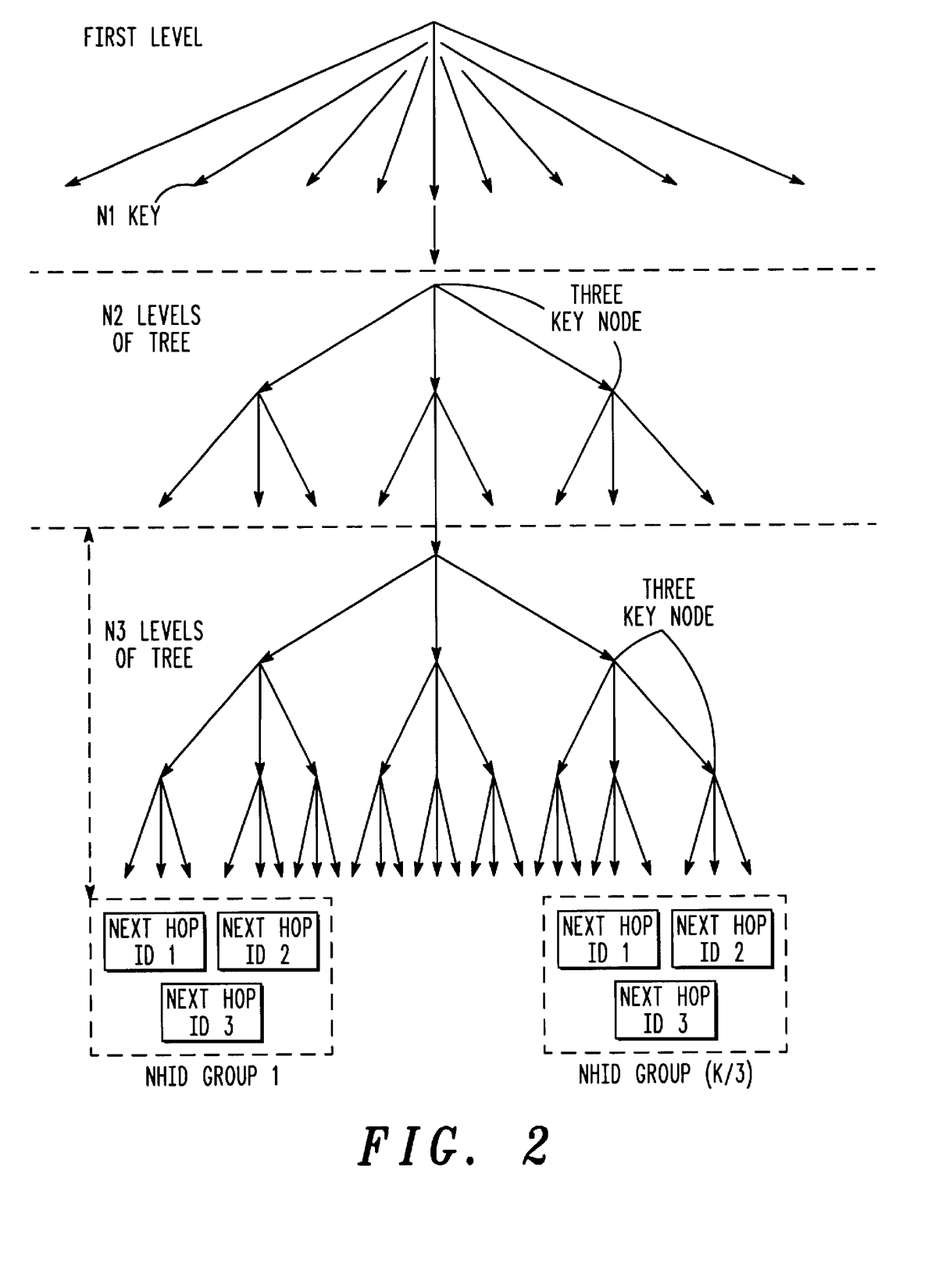
FIG. 2 is a schematic description of an N level tree of binary strings, according to a preferred embodiment of the invention.

FIG. 2 is a schematic description of an N level tree of binary strings, according to a preferred embodiment of the invention.

A first level of the tree, comprising of a single node having N1 keys (each key is a sorted binary string) is stored at CAM 40. N2 levels of the tree of sorted binary strings are stored at fast memory module 50 and a remaining N3 levels of the tree of sorted binary strings are stored at memory module 60. For convenience of explanation CAM 40, fast memory module 50 and memory module 60 are collectively referred to as memory modules.

Conveniently, N2 levels of the tree are comprised of a plurality of trinary nodes collectively referred to as NODES_2 200 and the following N3 levels of the tree are comprised of a plurality of trinary nodes collectively referred to as NODES_3 300. The last level of the tree comprises of a plurality of the next hop locations collectively referred to as NEXT HOP ID 14. Each key of first level of the tree points to a pair of sorted binary strings is stored in fast memory module 50. Each node of nodes NODES_2 200 and NODES_3 300 comprising two strings that point to three pairs of descending strings.

Conveniently, three next hop locations associated with a pair of sorted binary keys of the (N3+N2)'th level of the tree are stored in a group, in order to utilize the width of data bus 88 so that they can be fetched from external memory 60 during a single access to external memory 60.

Figure 4:
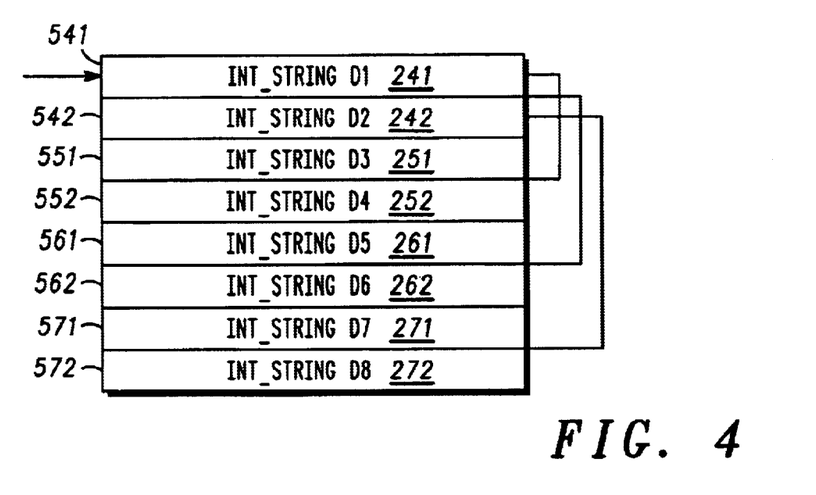
FIG. 4 is a schematic description of a trinary node and three descending trinary nodes, according to a preferred embodiment of the invention.

A node can be associated to descending node by various ways. A first way is to use pointers that are stored with each node, the pointers point to a location in memory in which the descending nodes are stored. That is relatively memory consuming but it does not limit the location of the descending nodes. A second way involves the arrangement of nodes in memory so that the location of a descending node can be calculated, so there is no need to store additional pointers. The second method is shown in FIGS. 2–4 but the first-way, and various combinations of the first way and second way are also acceptable.

FIG. 3 is a schematic description of the content of the memory modules, according to a preferred embodiment of the invention.

CAM 40 comprising a plurality of memory words located at addresses 401–499. Fast memory module 50 comprising of a plurality of memory words located at addresses 501–599. Memory module 60 comprising of a plurality of memory words located at addresses 601–699. CAM 40 stores the first level of the tree comprising of a plurality (A1) of sorted binary strings, referred to as CAM_STRING 1-CAM_STRING A1 101–199. Fast memory module 50 stores the descending N2 levels of the tree. These N2 levels are comprised of a plurality (A2) of sorted binary strings, referred to as INTR_STRING—INTR_STRING A2 201–299. Memory module 60 stores the remaining N3 levels of the tree. These N3 levels are comprised of a plurality (A3) of sorted binary strings, referred to as EXT_STRING 1-EXT_STRING A3 301–399 and of a plurality of leaf strings (a leaf string is referred to as LEAF), each leaf string comprises of at least one next hope ID. Usually A3>A2>A1.

Dashed arrows 71–76 and CAM_STRING 1 101, INTR_STRING 1 201, INTR_STRING 2 202, INTR_STRING C1 213, INTR_STRING C2 214, EXT_STRING B1 325, EXT_STRING B2 326, EXT_STRING B8 341, and LEAF_B 371 illustrate a result of a search in which the LEAF_B 371 is the best matching address/the selected next hop ID.

LEAF_B 371 is one out of three leafs associated to pair of strings EXT_STRING B8 341 and EXT_STRING B8 342. EXT_STRING B8 341 and EXT_STRING B8 342 are one out of three descending branches of pair of strings EXT_STRING B1 325 and EXT_STRING B2 326. EXT_STRING B1 325 and EXT_STRING B2 326 are one out of three descending branches of pair of strings INTR_STRING C2 214 and INTR_STRING C1 213. INTR_STRING C2 214 and INTR_STRING C1 213 are one out of three descending branches of pair of strings INTR_STRING 1 201 and INTR_STRING 2 202. INTR_STRING 1 and INTR_STRING 2 202 are associated with CAM_STRING 101.

The five stages correspond to the six levels of the tree. A first level is stored in CAM 40, two levels of the tree that are stored in fast memory 50 and three levels stored at memory module 60.

The first stage involves comparing DA 80 to the content of CAM 40. During the first stage a destination address DA 80 is compared to CAM_STRING 1 101—CAM_STRING A1 199, and a first intermediate matching address CAM_STRING 1 201 is generated. CAM_STRING 1 201 either exactly matches DA 80 or is the smallest sorted binary string stored in CAM 40 that is bigger than DA 80.

CAM_STRING 1 201 points to node comprising a pair of strings INTR_STRING 1 201 and INTR_STRING 2 202 as indicated by arrow 71. Conveniently these strings are fetched to search engine 81.

During a second stage of the search DA 80 is compared to INTR_STRING 1 201 and INTR_STRING 2 202 and accordingly INTR_STRING C1 213 and INTR_STRING C2 214 are selected and fetched to search engine 81, as indicated by arrow 72.

During a third stage of the search DA 80 is compared to INTR_STRING C1 213 and INTR_STRING C2 214 and accordingly EXT_STRING B1 326 and EXT_STRING B2 326 are selected and fetched to search engine 81, as indicated by arrow 73.

During a fourth stage of the search DA 80 is compared to EXT_STRING B1 325 and EXT_STRING B2 326 and accordingly EXT_STRING B8 341 and EXT_STRING B9 342 are selected and fetched to search engine 81, as indicated by arrow 74.

During a fifth stage of the search DA 80 is compared to EXT_STRING B8 341 and EXT_STRING B9 342 and accordingly LEAF_B 371 is provided as the selected next hop ID—as the best matching address.

FIG. 4 is a schematic description of trinary node 240 and three descending trinary nodes 250, 260 and 270, all nodes are stored within fast memory module 50, according to a preferred embodiment of the invention.

Trinary nodes 240, 250, 260 and 270 comprise of strings INT_STRING D1 241 and INT_STRING D2 242; INT_STRING D3 251 and INT_STRING D4 252;
INT_STRING D5 261 and INT_STRING D6 262; INT_STRING D7 271 and INT_STRING D8 272 accordingly. INT_STRING D3<INT_STRING D4<INT_STRING D1<INT_STRING D5<INT_STRING D6<INT_STRING D7<INT_STRING D2<INT_STRING D8.

Trinary node 240 is fetched to a search engine and is compared to DA 80. If DA<=INT_STRING D1, strings INT_STRING D3 and INT_STRING D4 are fetched to the search engine and are compared to DA 80. If INT_STRING D1<DA<=INT_STRING D2 then strings INT_STRING D5 and INT_STRING D6 are fetched to the search engine. If DA>INT_STRING D2 then strings INT_STRING D7 and INT_STRING D8 are fetched to the search engine.

Conveniently, strings INT_STRING D1-INT_STRING D8 241-272 are stored in consecutive memory locations 541-571 accordingly, so after DA is compared to INT_STRING D1 and INT_STRING D2 the address of the pair of strings to be fetched can be calculated by adding a variable, that reflects R 87.

For example, an address is calculated by the following manner: selected descending node address=address of parent node+R. If DA<=INT_STRING D1, then R=8, the next address equals 248=240+8 and INT_STRING D3 and INT_STRING D4 are fetched. If INT_STRING<DA<= INT_STRING D2 then R=16, next address equals 256= 240+16 and INT_STRING D5 and INT_STRING D6 are fetched. If DA>INT_STRING D2 then R=24, next address equals 264=240+24 and INT_STRING D7 and INT_STRING D8 are fetched.

Figure 5:
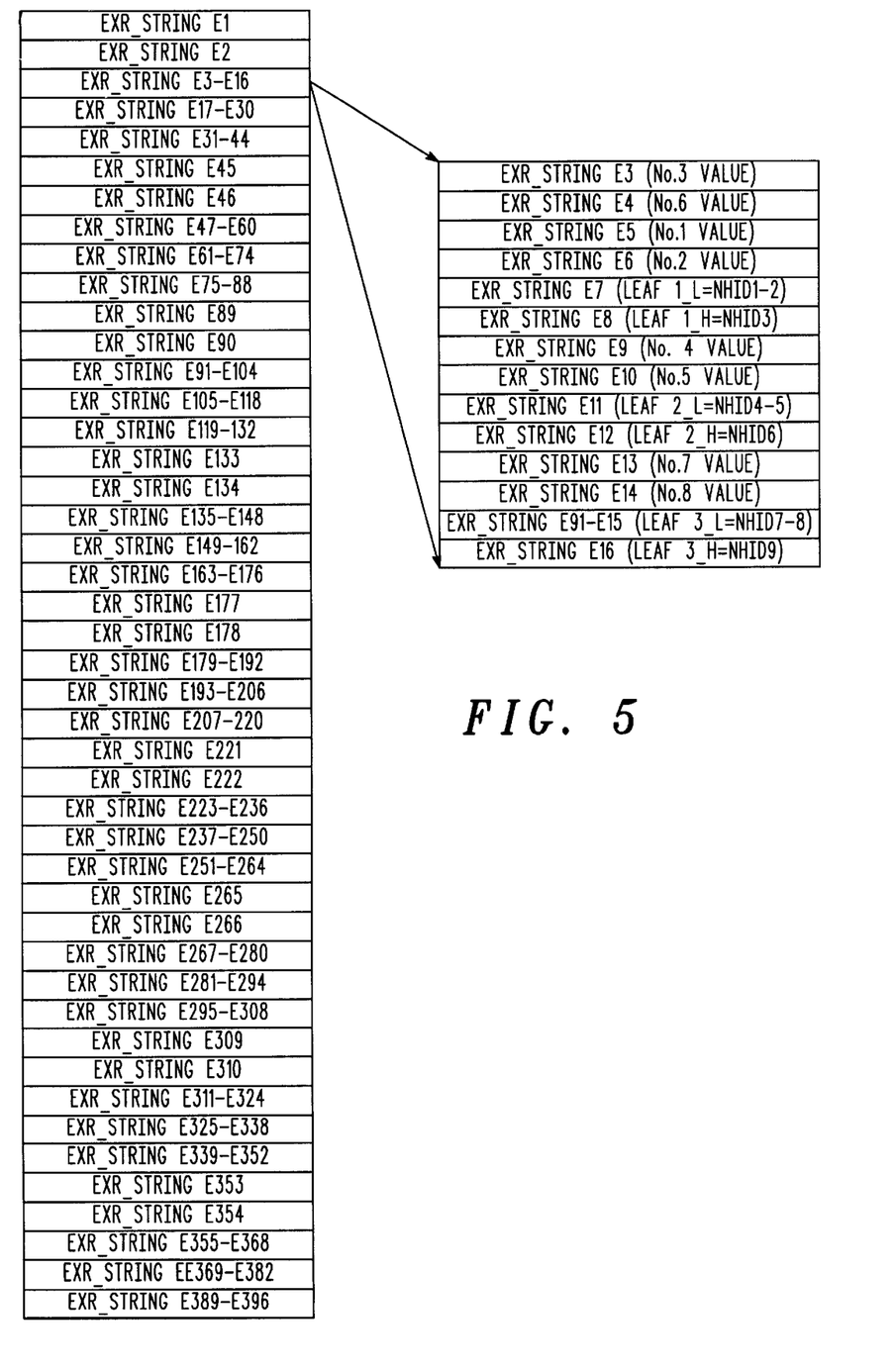
FIG. 5 is a schematic description of the last three level of the tree, stored at memory module 60, according to a preferred embodiment of the invention.

FIG. 5 is a schematic description of the last four level of the tree, stored at memory module 60.

The last four levels of the tree comprise of 396 strings, comprising a plurality of EXT_STRING strings and LEAF strings. For example, EXT_STRINGS E3–E16 comprise of EXT_STRING E3, EXT_STRING E4, EXT_STRING E5, EXT_STRING E6, EXT_STRING E9, EXT_STRING E10, EXT_STRING E13, EXT_STRING E14 and LEAF STRING E7, LEAF STRING E8, LEAF STRING E11, LEAF STRING E12, LEAF STRING E15 and LEAF STRING E16.

The (N2+N3−2)'th level of the tree is comprised of EXT_STRING E1, EXT_STRING E2, EXT_STRING E45, EXT_STRING E46, EXT_STRING E89, EXT_STRING E90, EXT_STRING E133, EXT_STRING E134, EXT_STRING E177, EXT_STRING E178, EXT_STRING E221, EXT_STRING E222, EXT_STRING E265, EXT_STRING E266, EXT_STRING E309, EXT_STRING E310, EXT_STRING E353 and EXT_STRING E354.

Each pair of successive binary sorted strings of the (N2+N3−1)'th level of the tree is a father to three pair of binary sorted strings of the (N2+N3)'th level of the tree, whereas each of the latter pairs is a father of three leafs. For example, EXT_STRING E1 and EXT_STRING E2 are the fathers of EXT_STRING E4, EXT_STRING E3, EXT_STRING E17, EXT_STRING E18, EXT_STRING E31 and EXT_STRING E32. EXT_STRING E3 and EXT_STRING E4 are fathers of EXT_STRINGE5, EXT_STRING E6, EXT_STRING E9, EXT_STRING E10, EXT_STRING E13 and EXT_STRING E13. Each pair of the sorted binary strings in the (N2+N3)'th level points to three next hop addresses.

Figure 6:
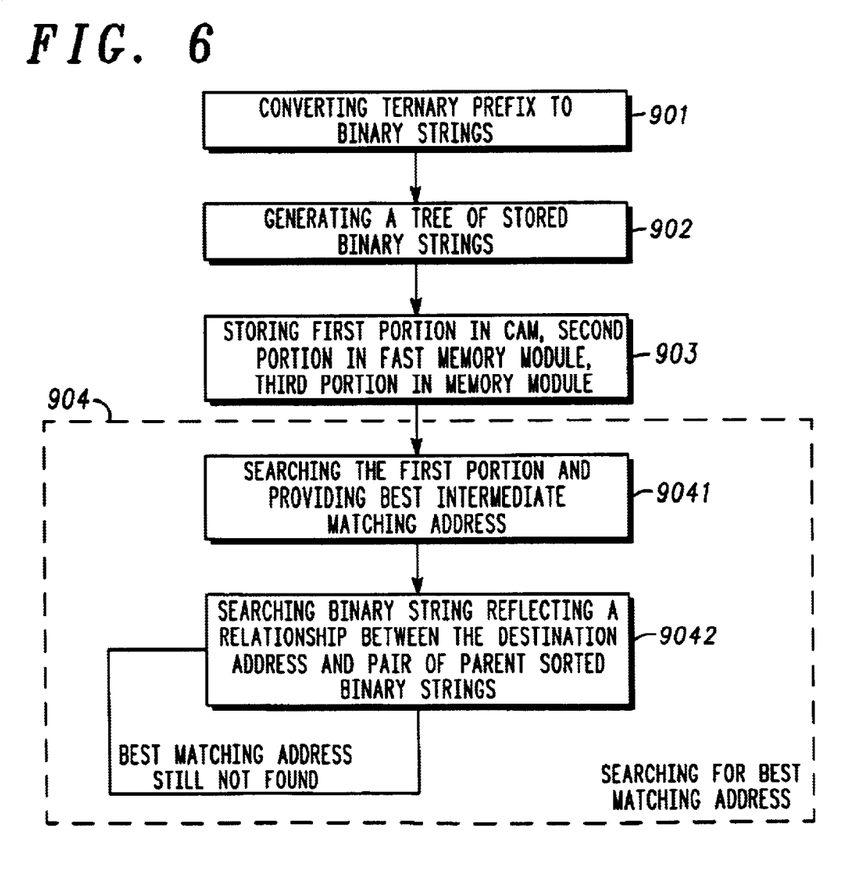
FIG. 6 is a schematic flow chart of a method for performing hierarchical address translation, according to a preferred embodiment of the invention.

FIG. 6 is a schematic flow chart of a method 90 for performing hierarchical address translation, according to a preferred embodiment of the invention. Method 90 Comprising the steps:

Converting (step 901) a plurality of ternary prefixes into a plurality of binary strings, each prefix being associated with a group of addresses reachable through device 8 for translating a hierarchical address. Usually,a trinary prefix that has at least one "don't care" bit is converted to two binary strings, a first binary string has "1" bit instead of each "don't care" bit of the trinary prefix, and a second binary string has "0" bit instead of each "don't care" bit of the trinary prefix. Preferably, the plurality of trinary prefixes have variable lengths, the plurality of trinary prefixes are converted into a plurality of fixed size prefixes by concatenating a plurality of "don't care" bits, the fixed size prefixes are to be converted to the plurality of binary strings.

Changing (step 902) a portion of the binary strings in a manner that a single pointer is associated to each binary string and sorting the binary strings. The binary strings that represent a start of a range are decreased and all the binary strings are sorted. Each sorted binary string is associated with a single pointer whereas the pointer is provided when the destination address falls in a range that starts with a sorted binary string (without including the sorted binary string) and ends at a consecutive sorted binary string that is bigger than the former sorted binary string Storing (step 903) the sorted binary strings in a CAM, in a fast memory module and in a relatively slow memory module (referred to as memory module).

Conveniently, a tree of sorted binary strings is generated from the sorted binary strings and a first portion of the tree is stored in a CAM, a second portion of the tree is stored in a fast memory module and a third portion of the tree is stored in a memory module. Conveniently, a first portion of the tree comprises a single node and N1 keys. A second portion of the tree comprises of a following N2 levels of the tree and a third portion comprises of the remaining N3 levels of the tree. The second and third portion are arranged in a trinary form.

Receiving (step 904) a hierarchical address and performing a search for finding a selected next hop ID. Conveniently, this step comprising the sub-steps of:

Searching (sub-step 9041) a first portion of a tree and providing a first intermediate best matching string. The first intermediate best matching string either exactly matches DA 80 or is a sorted binary string that is the smallest sorted binary string of the first portion of the tree that is bigger than AD 80. Conveniently, first intermediate best string points to a pair of sorted binary strings stored in fast memory module 50.

Searching (sub-step 9042) at least one sorted binary string of the second or third portion that reflect the relationship between DA 80 and a pair of parent sorted binary strings, until a leaf containing a next hop ID is found.

Preferably, step 9042 involves fetching to search engine 80 two sorted binary string stored in either fast memory module 50 of in memory module 60, comparing DA 80 to the fetched pair of sorted binary strings and fetching a descending pair of sorted binary strings out of three descending sorted binary strings, the fetched descending pair reflects the relationship between DA and a parent pair of sorted binary strings.

It should be noted that the particular terms and expressions employed and the particular structural and operational details disclosed in the detailed description and accompanying drawings are for illustrative purposes only and are not intended to in any way limit the scope of the invention as described in the appended claims.

An aspect of the invention is the use of a single pointer for each entry in the first array instead of two pointers for each entry in the first array. It practically does not matter whether a string exactly matches the destination address or the same string is associated to a narrowest enclosing range that matches the destination address, and accordingly a single pointer is enough.

Thus, there has been described herein an embodiment including at least one preferred embodiment of an improved phase detector and a method for performing address lookups. It will be apparent to those skilled in the art that the disclosed subject matter may be modified in numerous ways and may assume many embodiments other than the preferred form specifically set out and described above. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A device for translating a hierarchical address, the device is adapted to receive a destination address, to search an array of sorted binary string being associated with a group of addresses reachable through the device, and to provide a best matching address, the device comprising:

a content addressable memory module;

a fast memory module;

a memory module;

a search engine, coupled to the content addressable memory unit module, the fast memory module and the memory module, configured to receive a destination address, to access at least the fast memory unit and the memory unit and to find the best matching address; and a host processor, being coupled to the fast memory the content addressable memory module and the memory module, the host processor is adapted to receive a plurality of trinary prefixes, to generate the array of sorted binary strings and to store a first portion of the array of the sorted binary strings in the content addressable memory module; to store a second portion of the array of sorted binary strings in the fast memory module and to store a third portion of the array in the memory module.

2. The device of claim 1 wherein the array of sorted binary strings are arranged in a form of a tree.

3. The device of claim 2 wherein the first portion comprises of a single node and N1 keys, the second portion comprising N2 descending levels of the tree; and the third portion comprising a remaining N3 levels of the tree.

4. The device of claim 2 wherein the first portion is smaller than the second portion and the second portion is smaller then the third portion.

5. The device of claim 1 wherein the search engine is adapted to receive a first intermediate best matching string from the content addressable memory, to fetch a pair of sorted binary strings associated with the first intermediate best matching string, and to search at least one sorted binary string of the second or third portion that reflect the relationship between the destination address and a pair of parent sorted binary strings until a best matching address of the third portion is found.

6. The device of claim 1 wherein the host processor is adapted to generate the array of sorted binary strings by converting a plurality of ternary prefixes into a plurality of binary strings, changing a portion of the binary strings in a manner that a single pointer is associated to each binary string and sorting the binary strings and sorting the binary strings.

7. The device of claim 6 wherein the host processor converts the plurality of ternary prefixes to the plurality of fixed size trinary prefixes by by concatenating a plurality of "don't care" bits.

8. The device of claim 6 wherein a prefix that has at least one "don't care" bit is translated to two binary strings, a first binary string has a "1" bit instead of each "don't care" bit of the trinary prefix, and a second binary string has a "0" bit instead of each "don't care" bit of the trinary prefix.

9. A method for translating a hierarchical address, the method comprising:

comparing the hierarchical address to a first portion of a tree of sorted binary strings and fetching at least two parent sorted binary strings form a second portion of the tree associated with a first intermediate result, the tree of sorted binary strings comprising a plurality of binary strings, the plurality of binary strings being generated from a plurality of ternary prefixs, each prefix being associated with a group of addresses reachable through a device for translating a hierarchical address, the first portion of the tree of sorted binary strings is being stored in a content associative memory, the second portion of the tree is stored in a fast memory module and a third portion of the tree is stored in a memory module; wherein the first intermediate best matching string either exactly matches the hierarchical address or is a sorted binary string that is a smallest sorted binary string of the first portion of the tree that is bigger than the hierarchical address; and repeating the step of comparing the hierarchical address to at least two sorted binary strings of the second and third portions of the tree of sorted binary strings, until a best matching address of the third portion is found, wherein the at least two sorted binary strings reflect a relationship between the hierarchical address and at least a pair of parent sorted binary strings.

10. The method of claim 9 wherein the generation of sorted binary strings from trinary prefixes comprising the steps of converting a plurality of ternary prefixes into a plurality of binary strings and changing a portion of the binary strings in a manner that a single pointer is associated to each binary string and sorting the binary strings and sorting the binary strings.

11. The method of claim 10 wherein a trinary prefix that has at least one "don't care" bit is converted to two binary strings, a first binary string has "1" bit instead of each "don't care" bit of the trinary prefix, and a second binary string has "0" bit instead of each "don't care" bit of the trinary prefix.

12. The method of claim 11 wherein the plurality of trinary prefixes have variable lengths, the plurality of trinary prefixes are converted into a plurality of fixed size prefixes by concatenating a plurality of "don't care" bits, the fixed size prefixes are to be converted to the plurality of binary strings.

13. The method of claim 9 wherein the first portion of the tree comprises of a single node having N1 keys, the second portion of the tree comprises N2 levels of the tree and the third portion comprises a last N3 levels of the tree.

14. The method of claim 9 wherein the sub-step of searching at least one sorted binary string involves:

fetching to a search engine at least two sorted binary strings stored in either the fast memory module of in the memory module;

comparing the hierarchical address to the at least two sorted binary strings; and fetching a descending pair of sorted binary strings out of at least three descending sorting binary strings, the fetched descending pair reflects the relationship between the hierarchical address and a parent pair of sorted binary strings.

15. A method for translating a hierarchical address, the method comprising the steps of:
  converting a plurality of ternary prefixes into a plurality of binary strings, each prefix being associated with a group of addresses reachable through a device for translating a hierarchical address;
  changing a portion of the binary strings in a manner that a single pointer is associated to each binary string and sorting the binary strings;
  storing the sorted binary strings in a content addressable memory, in a fast memory module and in a relatively slow memory module; and
  receiving a hierarchical address and performing a search for finding a selected next hop ID.

16. The method of claim 14 wherein further comprising a step of generating a tree of the sorted binary strings; and
  wherein the step of storing the sorted binary strings involves storing a first portion of the tree in the content addressable memory, storing a second portion of the tree in the fast memory module and storing a third portion of the tree in the relatively slow memory module.

17. The method of claim 15 wherein the first portion of the tree comprises a single node and N1 keys, the second portion of the tree comprises of a following N2 levels of the tree and the third portion comprises of the remaining N3 levels of the tree.

18. The method of claim 15 wherein the step of receiving a hierarchical address and performing a search comprising the substeps of:
  searching a first portion of a tree and providing a first intermediate best matching string, the first intermediate best matching string either exactly matches a destination address or is a sorted binary string that is the smallest sorted binary string of the first portion of the tree that is bigger than the hierarchical address; and
  searching at least one sorted binary string of the second or third portion that reflect the relationship between the hierarchical address and a pair of parent sorted binary strings, until a leaf containing a next hop ID is found.

19. The method of claim 18 wherein the step of changing a portion of the binary strings involves decreasing each second binary string.

20. The method of claim 15 wherein the step of receiving a hierarchical address and performing a search for finding a selected next hop ID comprises comprising the sub_steps of:
  fetching to a search engine two sorted binary string stored in either fast memory module of in the relatively slow memory module;
  comparing the hierarchical address to the fetched pair of sorted binary strings; and
  fetching a descending pair of sorted binary strings out of three descending sorted binary strings, the fetched descending pair reflects the relationship between the hierarchical address and a parent pair of sorted binary strings.

21. The method of claim 20 wherein each sorted binary string is associated with a single pointer; and
  whereas during the step of receiving a hierarchical address and performing a search for finding a selected next hop ID, the single pointer is provided when the destination address falls in a range that starts with a sorted binary string, without including the sorted binary string, and ends at a consecutive sorted binary string that is bigger than the sorted binary string.

22. The method of claim 14 wherein the step of converting a plurality of trinary prefixes into a plurality of binary strings comprising the sub steps of:
  converting a variable size trinary prefixes into a plurality of fixed size prefixes by concatenating a plurality of "don't care" bits; and
  converting each fixed size trinary prefixes having "don't care" bits to two binary strings, a first binary string has "1" bit instead of each "don't care" bit of the trinary prefix, and a second binary string has "0" bit instead of each "don't care" bit of the trinary prefix.

* * * * *

UNITED STATES PATENT AND TRADEMARK OFFICE
CERTIFICATE OF CORRECTION

PATENT NO. : 6,711,661 B1
DATED : March 23, 2004
INVENTOR(S) : Boris Zabarski, Stefania Gandal and Vadim Vayzer It is certified that error appears in the above-identified patent and that said Letters Patent is hereby corrected as shown below:

Column 9,
Lines 16-19, change "device is adapted to receive a destination address, to search an array of sorted binary string being associated with a group of addresses reachable through the device, and to provide a best matching address, the" to -- device, the --.
Line 27, change "memory unit and to find" to -- memory unit to search an array of sorted binary strings being associated with a group of addresses reachable through the device to find --.
Line 31, change "The host processor is adapted" to -- the host processor is arranged --.
Lines 41-44, change "the device of claim 2 wherein the first portion comprises of a single node and N1 keys the second portion comprising N2 descending levels of the tree; and the third portion comprising a remaining N3 levels of the tree." to -- The device of claim 2 wherein the first portion comprises a single node and N1 keys, the second portion comprises N2 descending levels of the tree; and the third portion comprises a remaining N3 levels of the tree. --
Line 47, change "smaller then the third portion" to -- smaller than the third portion --.
Line 49, change "adapted to receive" to -- arranged to receive --.
Line 53, change "portion that reflect the" to -- portion that reflects the --.
Lines 57-63, change "The device of claim 1 wherein the host processor is adapted to generate the array of sorted binary strings by converting a plurality of ternary prefixes into a plurality of bnary strings, changing a portion of the binary strings in a manner that a single pointer is associated to each binary string and sorting the binary strings and sorting the binary strings." to -- The device of claim 1 wherein the host processor is arranged to generate the array of sorted binary strings by converting a plurality of trinary prefixes into a plurality of binary strings, changing a portion of the binary strings in a manner that a single pointer is associated with each binary string and sorting the binary strings. --
Lines 64-67, change "The device of claim 6 wherein the host processor converts the plurality of ternary prefixes to the plurality of fixed size trinary prefixed by by concatenating a plurality of "don't care" bits." to -- The device of claim 6 wherein the host processor converts the plurality of trinary prefixes to a plurality of fixed size trinary prefixes by concatenating a plurality of "don't care" bits --

Column10,
Line 10, change "binary strings form" to -- binary strings from --.
Line 14, change "plurality of ternary prefixs," to -- plurality of trinary prefixes, --.

UNITED STATES PATENT AND TRADEMARK OFFICE
CERTIFICATE OF CORRECTION

PATENT NO.     : 6,711,661 B1
DATED          : March 23, 2004
INVENTOR(S)    : Boris Zabarski, Stefania Gandal and Vadim Vayzer It is certified that error appears in the above-identified patent and that said Letters Patent is hereby corrected as shown below:

Column 10 (cont'd),
Lines 33-39, change "The method of claim 9 wherein the generation of sorted binary strings from trinary prefixes comprising the steps of converting a plurality of ternary prefixes into a plurality of binary strings and changing a portion of the binary strings in a manner that a single pointer is associated to each binary string and sorting the binary strings and sorting the binary strings." to -- The method of claim 9 wherein generation of sorted binary strings from trinary prefixes comprises the steps of converting a plurality of trinary prefixes into a plurality of binary strings and changing a portion of the binary strings in a manner that a single pointer is associated to each binary string and sorting the binary strings. --
Line 52, change "comprises of a single node" to -- comprises a single node --.
Line 55, change "wherein the sub-step" to -- wherein a sub-step --.

Column 11,
Line 3, change "plurality of ternary prefixes" to -- plurality of trinary prefixes --.
Line 16, change "claim 14 wherein further" to -- claim 15 further --.
Lines 26-27, change "comprises of a following N2 levels of the tree and the third portion comprises of the remaining N3" to -- comprises a following N2 levels of the tree and the third portion comprises the remaing N3 --.

Column 12,
Line 6, change "next hop ID comprises comprising the" to -- next hop ID comprises the --.
Lines 8-9, change "fetching to a search engine two sorted binary string stored in either fast memory module of in the relatively slow" to -- fetching from a search engine two sorted binary strings stored in either fast memory module or in the relatively slow --.
Line 29, change "The method of claim 14" to -- The method of claim 15 --.

Signed and Sealed this

Twenty-seventh Day of July, 2004

JON W. DUDAS
*Acting Director of the United States Patent and Trademark Office*